(12) United States Patent
Lee et al.

(10) Patent No.: US 7,944,964 B2
(45) Date of Patent: May 17, 2011

(54) APPARATUS AND METHOD FOR STABLE DEF USING SELECTIVE FBF

(75) Inventors: Jae-Ho Lee, Daejon (KR); O-Hyung Kwon, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1097 days.

(21) Appl. No.: 11/634,495

(22) Filed: Dec. 6, 2006

(65) Prior Publication Data

US 2007/0133672 A1 Jun. 14, 2007

(30) Foreign Application Priority Data

Dec. 9, 2005 (KR) .................. 10-2005-0121138
Aug. 7, 2006 (KR) .................. 10-2006-0074179

(51) Int. Cl.
*H03H 7/30* (2006.01)
(52) U.S. Cl. ...................... 375/231; 375/233
(58) Field of Classification Search .............. 375/230, 375/229, 233, 231, 232
See application file for complete search history.

(56) References Cited

U.S. PATENT DOCUMENTS

| | | | |
|---|---|---|---|
| 5,940,440 A | | 8/1999 | Werner et al. |
| 6,320,904 B1 * | | 11/2001 | Velez et al. .................... 375/233 |
| 6,515,713 B1 * | | 2/2003 | Nam ............................. 348/614 |
| 6,816,548 B1 * | | 11/2004 | Shiue et al. .................... 375/233 |
| 7,158,568 B2 * | | 1/2007 | Park et al. ....................... 375/233 |
| 7,492,818 B2 * | | 2/2009 | Markman et al. ............. 375/233 |
| 2005/0243908 A1 * | | 11/2005 | Heo et al. ...................... 375/233 |
| 2007/0104264 A1 * | | 5/2007 | Park et al. ...................... 375/233 |

FOREIGN PATENT DOCUMENTS

| | | |
|---|---|---|
| JP | 06-104692 | 4/1994 |
| KR | 10-1998-063934 | 7/1998 |
| KR | 10-2000-0046149 A | 7/2000 |
| KR | 1020030054304 A | 7/2003 |
| KR | 1020040052007 A | 6/2004 |
| KR | 10-2004-0067062 A | 7/2004 |

* cited by examiner

*Primary Examiner* — Dac V Ha
(74) *Attorney, Agent, or Firm* — LRK Patent Law Firm (57) ABSTRACT

A decision feedback equalizing apparatus selectively using a feedback filter and a method thereof are provided. The apparatus includes: an equalizing unit including a feed forward filter (FFF) for correcting a distorted transmission channel by receiving a match-filtered signal and a feedback filter (FBF) for reducing inter symbol interference ISI of the corrected transmission channel for driving only the FFF in a blind mode and driving the FFF and the FBF in a decision directed mode; a diverge/converge determining unit for determining whether the decision feedback equalizing apparatus is diverged or converged using a unit square error obtained through a least unit square algorithm; and a filter controlling unit for controlling the equalizing unit in a blind mode if the decision feedback equalizing apparatus is determined as divergence, and for controlling the equalizing unit in a decision directed mode if the decision feedback equalizing apparatus is determined as convergence.

9 Claims, 6 Drawing Sheets

APPARATUS AND METHOD FOR STABLE DEF USING SELECTIVE FBF

FIELD OF THE INVENTION

The present invention relates to a decision feedback equalizing (DFE) apparatus selectively using a feedback filter (FBF) and a method thereof; and, more particularly, to a decision feedback equalizing apparatus selectively using a feedback filter for stably driving an equalizer and improving a recognition rate of a receiving signal by determining an equalizer is diverged or converged using a mean square error (MSE), interrupting a feedback filter to drive the decision feedback equalizing apparatus in a bind mode in case of the divergence, and driving a feedback filer to drive the decision feedback equalizing apparatus in a decision directed mode in case of convergence.

DESCRIPTION OF RELATED ARTS

In a digital communication system, a transmission signal transmitted from a transmitter is distorted while traveling through a transmission channel due to a band limited channel characteristic. Factors of distorting the transmission signal are gauss heat noise, impulse noise, adding or multiplying noise added or multiplied by fading where signal intensity varies in a temporal domain, frequency variation, non-linearity, and temporal divergence. The distortion influences adjacent symbols each other. Such an inter symbol interference (ISI) is a major factor to degrade the performance of a communication system. An equalizer minimizes the ISI. That is, the equalizer increases the power of a transmitting signal by correcting the intensity of a receiving signal and delay characteristics or improves the quality of a transmission channel without widening the communication channel.

A least means square (LMS) algorithm and a recursive least square (RLS) algorithm are generally used in a typical equalizer. The LMS algorithm is a scheme for minimizing a means square error (MSE) of errors between a received signal and a quantized signal. Related equations of the LMS algorithm are simpler, the LMS algorithm uses hardware less than the RLS algorithm. However, the channel adaptation speed of the LMS algorithm is slow. The RLS algorithm is a scheme that minimizes the sum of square of weighted error signal. The RLS algorithm updates a filter coefficient using a recursive method. The RLS algorithm can equalize a channel more effectively than the LMS algorithm but the hardware complexity thereof is higher.

In general, the equalizer is classified into a data aided equalizer if a known training symbol is present and a blind equalizer if a known training symbol is not present.

The blind equalizer uses a reduced constellation algorithm (RCA), a constant modulus algorithm (CMA), and an algorithm using multi-coefficient.

The RCA algorithm starts channel adaptation by reducing a constellation of a transmit signal, and restores the constellation after channel adaptation.

The CMA algorithm is a blind algorithm that draws one circle with an origin of a constellation, calculates a distance between the origin and the circle, and adapts a tab coefficient in a direction of reducing a distance. In a view of convergence speed, a slow convergence speed is shown when an eye pattern is close. When the eye pattern is open, a fast convergence speed is shown.

The multi-modulus algorithm (MMA) is similar to the CMA. The MMA sets reference values at an imaginary number axis and a real number axis, and adapts a tab coefficient in a direction of reducing a distance to the reference. The MMA is introduced to be suitable to an orthogonal modulation scheme such as a quadrature amplitude modulation (QAM) and a carrierless amplitude and phase modulation (CAP).

The equalizer is classified into a linear equalizer if it does not include a feed forward filer (FFF) and a non linear equalizer if it includes a FFF.

For example, a cable television (CATV) MODEM in a hybrid fiber coaxial (HFC) network will be described as an example of using a decision feedback equalizer. However, the decision feedback equalizer according to the present invention is not limited to the CATV MODEM in the HFC network.

US Cable Labs introduces data over cable service interface specification (DOCSIS) for transmitting and receiving broadcasting and digital data using a HFC network. Recently, DOCSIS 3.0 has been developed. DOCSIS 3.0 requires a speed of several hundreds Mbps. For such a high speed data communication, a modulation and demodulation scheme having superior bandwidth efficiency must be used.

Since the CATV MODEM does not use a preamble, a channel is compensated using a received symbol. A blind equalizer is used to compensate the channel using the received symbol.

As a conventional technology for decision feedback equalization, a first conventional technology was introduced in Korea Patent Application No. 10-2002-0079723 entitled "DIGITAL SUBSCRIBER LINE MODEM HAVING ADAPTIVE FILTER FOR COMPENSATING NULL GENERATED BY BRIDGED TAP." The first conventional technology relates to a method for minimizing a transmit error by compensating a null by a bridged tap of a line using a null compensating filter and a null tracking unit in front of an equalizer in a CAP or a QAM high speed digital access network MODEM, and a data receiver using the same.

As another conventional technology, a second conventional technology using a blind algorithm was introduced in U.S. Pat. No. 5,940,440 entitled "GENERALIZED MULTI-MODULUS TECHNIQUE FOR BLIND EQUALIZATION." The second conventional technology relates to a blind equalization in a receiver. That is, it relates to a multi-modulus algorithm (MMA).

The first conventional technology minimizes a transmit error by compensating frequency null, and the second conventional technology performs stable equalization using the MMA. However, the first and second conventional technologies have a limitation to reduce transmit errors because the first and second conventional technologies drive both of the feed forward filter and the feedback filter in the blind mode.

SUMMARY OF THE INVENTION

It is, therefore, an object of the present invention to provide a decision feedback equalizing apparatus selectively using a feedback filter for stably driving an equalizer and improving a recognition rate of a receiving signal by determining an equalizer is diverged or converged using a mean square error (MSE), interrupting a feedback filter to drive the decision feedback equalizing apparatus in a bind mode in case of the divergence, and driving a feedback filer to drive the decision feedback equalizing apparatus in a decision directed mode in case of convergence.

In accordance with an aspect of the present invention, there is provided a decision feedback equalizing apparatus selectively using a feedback filter including: an equalizing unit including a feed forward filter (FFF) for correcting a distorted transmission channel by receiving a match-filtered signal and a feedback filter (FBF) for reducing an inter symbol interference (ISI) of the corrected transmission channel for driving only the FFF in a blind mode and driving the FFF and the FBF in a decision directed mode; a diverge/converge determining unit for determining whether the decision feedback equalizing apparatus is diverged or converged using a unit square error (MSE) obtained through a least unit square (LMS) algorithm; and a filter controlling unit for controlling the equalizing unit in a blind mode if the decision feedback equalizing apparatus is determined as divergence, and for controlling the equalizing unit in a decision directed mode if the decision feedback equalizing apparatus is determined as convergence.

In accordance with another aspect of the present invention, there is also provided an equalizing method applied to a decision feedback equalizing apparatus including a feed forward filter and a feedback filter including the steps of: a) performing an equalization using only the feed forward filter at an initial stage; b) determining whether the decision feedback equalizing apparatus is diverged or converged using a unit square error (MSE) obtained through a least unit square (LMS) algorithm for the equalization result from the step a); c) performing a blind equalization that drives the feed forward filter only if the divergence is determined at the step b) and performing the step b) for determining whether the decision feedback equalizing apparatus is diverged or converged for the blind equalization result; and d) performing a decision directed equalization that drives the feed forward filter and the feedback filter if the convergence is determined at the step b), and performing the step b) for determined whether the decision feedback equalizing apparatus is diverged or converged.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a decision feedback equalizing apparatus selectively using a feedback filter and a method thereof will be described in more detail with reference to the accompanying drawings.

Figure 1:
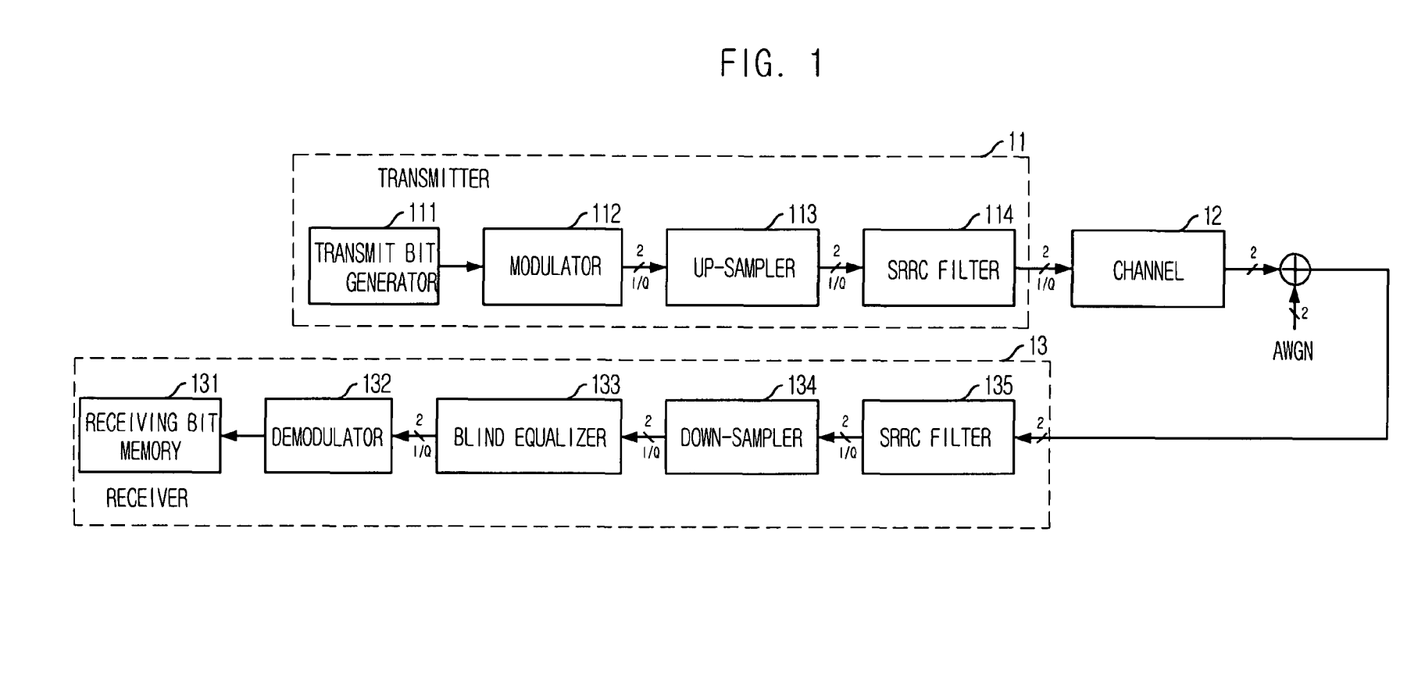
FIG. 1 is a block diagram illustrating a cable MODEM using a decision feedback equalizing apparatus selectively using a feedback filter in accordance with an embodiment of the present invention.

FIG. 1 is a block diagram illustrating a cable MODEM using a decision feedback equalizing apparatus selectively using a feedback filter in accordance with an embodiment of the present invention.

As shown in FIG. 1, the cable MODEM using the decision feedback equalizing apparatus selectively using the feedback filter according to the present embodiment includes a transmitter 11 and a receiver 13. The transmitter 111 includes a transmit bit generator 11 for generating bits, a M-ary modulator 112 for mapping input bit sequence to 640 QAM symbols or 256 QAM symbols, an up-sampler 113 for up-sampling to the constant times of symbol speed, and a SRRC filter 114 that is a matched filter for minimizing the influence of noise added while transmitting a signal.

The receiver 13 includes a SRRC filter 135 used as a matched filter, a down sampler 134 for down-sampling at the constant times of the symbol speed, a blind equalizer 133 for compensating a channel, a demodulator 132 for demodulating data according to data speed, and a receiving bit memory 131 for storing received bits.

As shown, the cable MODEM includes a channel 200 and an additive white Gaussian noise (AWGN) for modeling the influence of a HFC network.

The constitutional elements of the cable MODEM use following parameters in table 1.

TABLE 1

| Block 1 | Parameter |
|---|---|
| M-ary modulator | The number of bits per a symbol: 6(64 QAM) |
| Up-sampler | Four times of symbol speed |
| SRRC filter | Length: −16T~16T, alpha = 0.2 |
| Down sampler | Two times of symbol speed |
| M-ary demodulation | The number of bits per a symbol: 6(64 QAM) |

Figure 2:
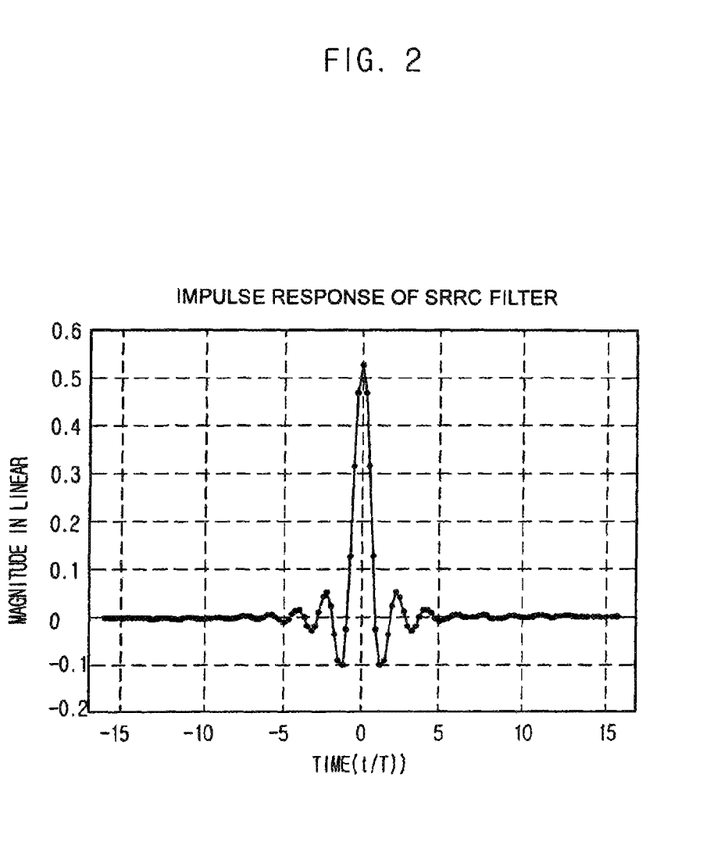
FIG. 2 is a graph illustrating an impulse response of a SSRC filter in FIG. 1 in accordance with an embodiment of the present invention.

FIG. 2 is a graph illustrating an impulse response of a SRRC filter in FIG. 1 in accordance with an embodiment of the present invention.

The impulse response g(t) on a spatial domain of the SRRC filter 135 can be expressed as following Eq. 1.

The impulse response g(t) on a spatial domain of the SSR filter 135 can be expressed as following Eq. 1.

$$g(t) = \frac{\sin\left[\frac{\pi t}{T}(1-\alpha)\right] + \frac{4\alpha t}{T}\cos\left[\frac{\pi t}{T}(1+\alpha)\right]}{\frac{\pi t}{T}\left[1 - \left(\frac{4\alpha t}{T}\right)^2\right]} \quad \text{Eq. 1}$$

Figure 3:
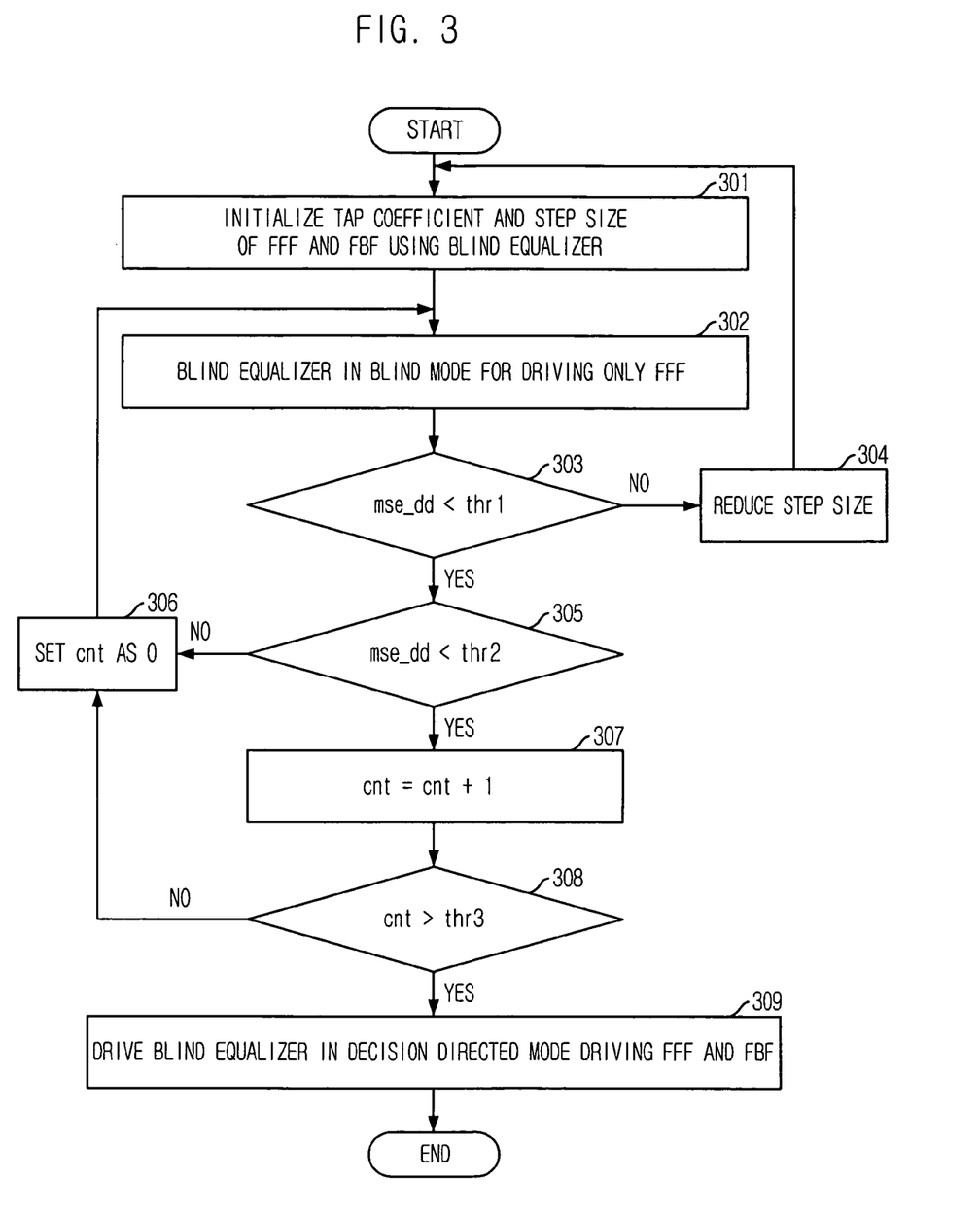
FIG. 3 is a flowchart illustrating a method of decision feedback equalizer selectively using a feedback filter according to an embodiment of the present invention.

FIG. 3 is a flowchart illustrating a method of decision feedback equalizer selectively using a feedback filter according to an embodiment of the present invention.

The decision feedback equalizer (DFE) initializes the tap coefficient and a step size (mu_b, mu_dd) of a feed forward filter (FFF) and a feedback filter (FBF) at an initial state at step S301. Then, the DEF apparatus is operated at a bind mode for driving only the feed forward filter (FFF) at step S302.

Figure 4A:
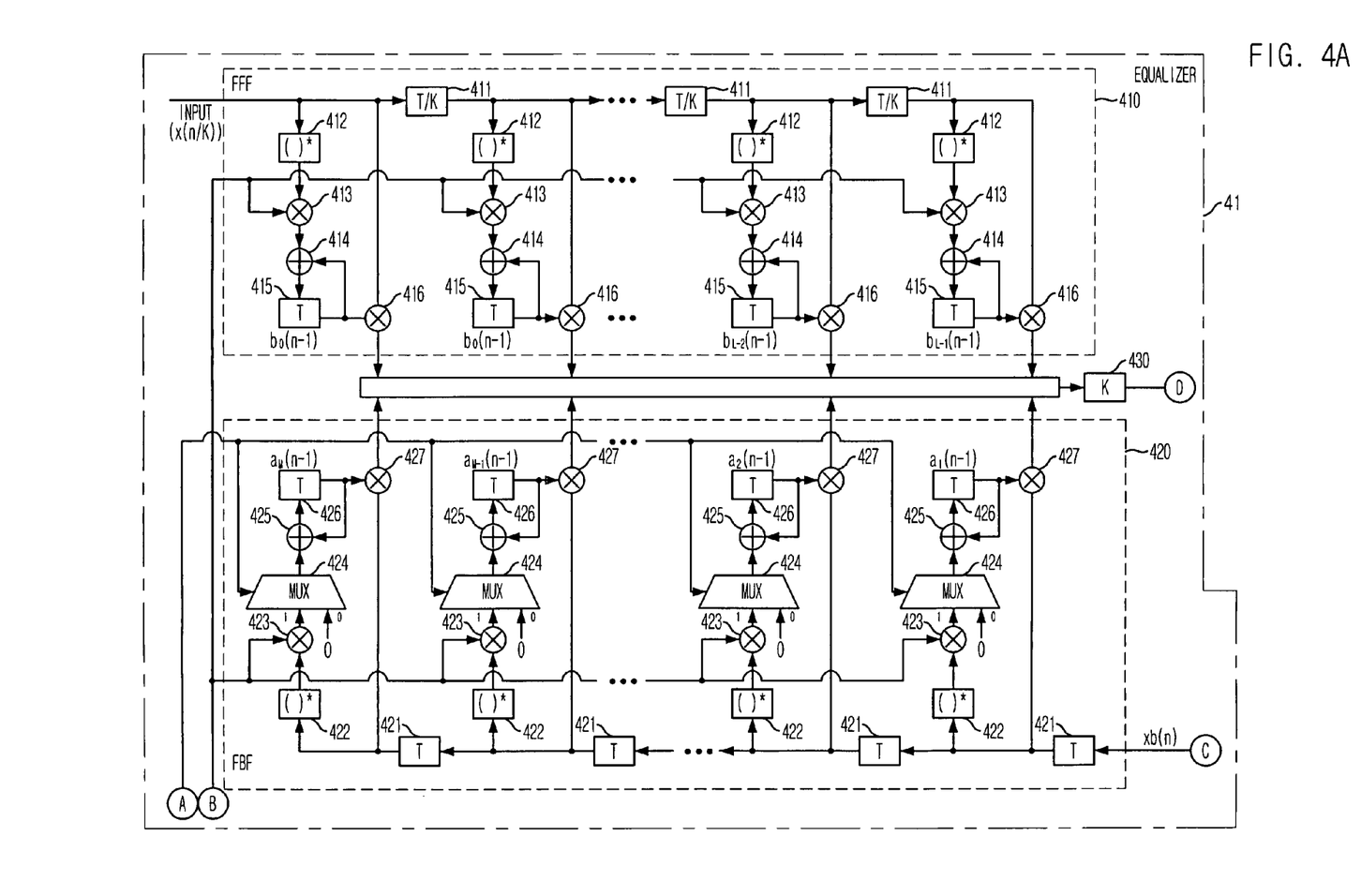
FIGS. 4A and 4B are detailed block diagrams illustrating a decision feedback equalizing apparatus selectively using a feed forward filter according to an embodiment of the present invention.
Figure 4B:
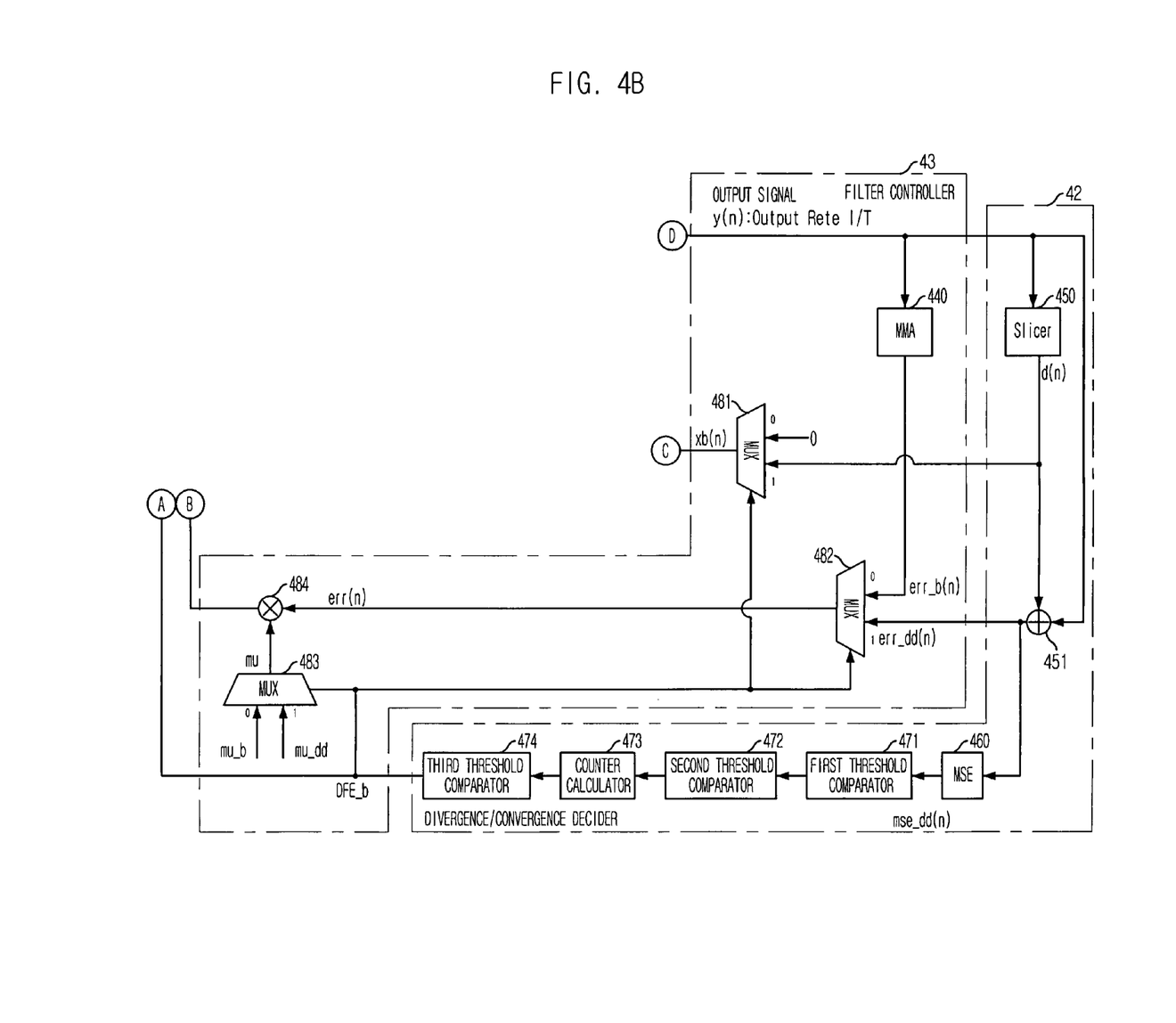

Afterward, a first threshold comparator 471 shown in FIG. 4B determines whether the means square error value is smaller than the first threshold value by comparing the mse_dd value that is the mean square error with the first threshold value thr1 at step S303. If the means square error value is larger than the first threshold value, the step sizes mu_b and mu_dd are reduced at step S304 because it means that the decision feedback equalizer is in a divergence mode. Then, the tap coefficients of the FFF and FBF and the step sizes mu_b and mu_dd are initialized at step S301.

If the means square error value is smaller than the first threshold value at step S303, the second threshold comparator 472 compares the mean square error mes_dd with a second threshold thr2 at step S305. If the mean square error mes_dd is larger than the second threshold thr2 at step S305, a counter is set to 0 at step S306, and the step S302 is performed again for driving the DEF apparatus in a blind mode with only the feed forward filter (FFF) driven.

If the mean square error mes_dd is smaller than the second threshold thr2 at step S305, a counter cnt increases by one at step S307 while driving the DEF apparatus continuously in the blind mode.

Then, a third threshold comparator 474 determines whether the increased counter value exceeds a third threshold value thr3 at step S308. If the increased counter value is smaller than the third threshold value thr3 at step S308, a counter value is set to 0, and the step S302 is performed again for driving the DEF apparatus in a bind mode with only the feed forward filter (FFF) driven.

If the increased counter value is larger than the third threshold value thr3 at step S308, the DEF apparatus is driven in a decision directed mode.

After driving the DEF apparatus in the decision directed mode, the mean square error mse_dd is continuously compared to the first and second threshold values, and the counter value is also continuously compared to the third threshold value.

Table 2 shows parameters in the decision feedback equalizing apparatus according to an embodiment of the present invention.

TABLE 2

| Parameter | Value |
| --- | --- |
| number of tabs of FFF | 24 |
| initial values of FFF | [, 0, 0, 0, 0, 0, 0, 0, 0, 0, 0, 0, 0, 0, 0, 1, 0, 0, 0, 0, 0, 0, 0, 0, 0, 0] |
| number of tabs in FBF | 6 |
| initial values of FBF | [0, 0, 0, 0, 0, 0] |
| first threshold thr1 | 0.5 |
| second threshold thr2 | 0.01190476 |
| third threshold thr3 | 64 |
| step size of blind mode mu_b | $2^{-10}$ |
| Step size of decision directed mode (mu_dd) | $2^{-14}$ |

FIGS. 4A and 4B are detailed block diagrams illustrating a decision feedback equalizing apparatus selectively using a feed forward filter according to an embodiment of the present invention. Herein, A, B, C and D in FIG. 4A are connected to A, B, C and D in FIG. 4B in manner of A-A, B-B, C-C and D-D.

The DFE apparatus selectively using the feed forward filter according to the present invention includes an equalizer 41, a divergence/convergence decider 42, and a filter controller 43. The equalizer 41 includes a feed forward filter 410, a feedback filter 420, and a down sampler 430. The divergence/convergence decider 42 includes a slicer 450, a subtractor 451, a mean square error calculator 460, a first threshold comparator 471, a second threshold comparator 472, a counter calculator 473, and a third threshold comparator 474. The filter controller 43 includes a multi-coefficient generator 440, a first multiplexer 481, a second multiplexer 482, and a third multiplexer 483. Hereinafter, the constitutional elements of the DFE apparatus according to the present embodiment will be described in detail.

As shown in FIG. 4A, the FFF 410 includes a delay 411, a conjugate complex number 412, a multiplier 413, an adder 414, a delay 415 and a multiplier 416, and the FBF 420 includes a delay 421, a conjugate complex number 422, a multiplier 423, a multiplexer 424, an adder 425, a delay 426 and a multiplier 427.

Since the sum of the FFF 410 and the FBF 420 is outputted at two times of a symbol speed, the sum is outputted at a symbol speed while passing through the down sampler 430. Herein, a value of k in the down sampler 430 is 2, and the output y(n) is shown in Eq. 2.

$$y(n) = \sum_{i=0}^{L-1} b_i x(n/K - i) + \sum_{j=1}^{M} a_j xb(n - 1 - j) \quad \text{Eq. 2}$$

$$(L = 24, M = 6)$$

In Eq. 2, y(n) is inputted to the multi-coefficient generator 440 and the slicer 450.

Figure 5:
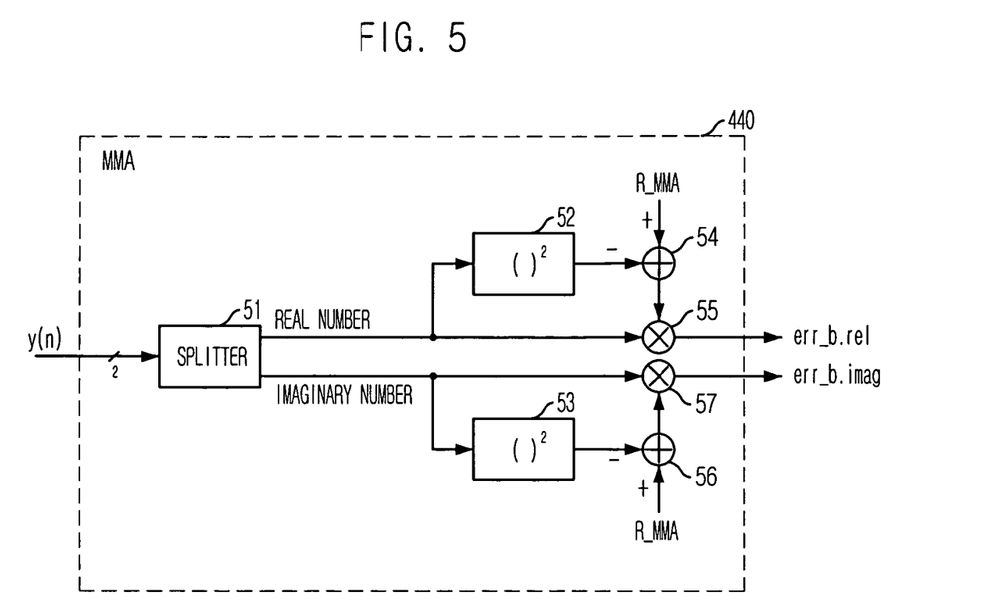
FIG. 5 is a block diagram illustrating a multi-constant generator (MMA) of FIG. 4B in accordance with an embodiment of the present invention.

FIG. 5 is a block diagram illustrating a multi-coefficient generator (MMA) of FIG. 4b in accordance with an embodiment of the present invention.

As shown in FIG. 5, the multi-coefficient generator 440 includes a splitter 51 for dividing the conjugate complex number into a real number part and a complex number part, square units 52 and 53, subtractors 54 and 56, and multipliers 55 and 57 for squaring the real number part and the complex number part. The multi-coefficient generator 440 outputs a first error value err_b(n) which is a conjugate complex number, and the first error value err-b(n) is shown in Eq. 3.

$$\text{err\_}b(n) = \text{real}(y(n)) \times (R\_MMA^2 - |\text{real}(y(n))|^2) \\ (R\_MMA = 0.9382) + j^* \text{imag}(y(n)) \times (R\_MMA^2 - |\text{imag}(y(n))|^2) \quad \text{Eq. 3}$$

A second error value is generated by subtracting y(n) from the output (d(n)) of the slicer 450, and it is shown in Eq. 4.

$$\text{err\_}dd(n) = d(n) - y(n) \quad \text{Eq. 4}$$

The mean square error calculator 460 receive the second error value err_dd and calculated a mean square error mse_dd (n), and the mean square error mse_dd is shown in Eq. 5.

$$\text{mse\_}dd(n) = \frac{\sum_{n=0}^{63} (|\text{err\_}dd(n)|^2)}{64} \quad \text{Eq. 5}$$

The diverge/converge determiner 42 includes a slicer 450, a subtractor 451, a mean square error calculator 460, a first threshold comparator 471, a second threshold comparator 472, a counter calculator 473, and a third threshold comparator 474.

The first threshold comparator 471 compares a mean square error value calculated from the mean square error calculator 460 with a first threshold. If the mean square error value is larger than the first threshold value, it determines it as divergence so the step size is reduced and the tab coefficient is initialized.

The second threshold comparator 472 determines it as divergence so a counter value is set to 0 if the mean square error value is smaller than the first threshold value.

The counter calculator 473 increases a counter value by one only if the mean square error value is smaller than the second threshold value.

The third threshold comparator 474 determines it as divergence so a counter value is set to 0 if the increased counter value is smaller than the third threshold value, or determines it as convergence if the increased counter value is larger than the third threshold value.

The diverge/converge determiner 42 generates a multiplexing signal DFE_b for multiplexing a first error value err_b of a blind mode and a second error value err_dd of a decision directed mode by comparing the mean square error value to the first threshold value or the second threshold value. The multiplexing signal DFE_b is inputted the filter controller 43 to control the equalizer 41.

The filter controller 43 includes a multi-coefficient generator 440, a first multiplexer 481, a second multiplexer 482, and a third multiplexer 483. The filter controller 43 stops the feedback filter to drive the decision feedback equalizing apparatus in a blind mode if the diverge/converge determiner 42 decides it as divergence. The filter controller 43 drives the feedback filter to drive the decision feedback equalizing apparatus in a decision directed mode if the diverge/converge determiner 42 decides it as convergence.

The first multiplexer 481 inputs 0 to the feedback filter 420 to drive it in a blind mode if the diverge/converge determiner 42 decides it as divergence. The first multiplexer 481 inputs the output d(n) of the slicer to the feedback filter 420 to drive it in a decision directed mode if the diverge/converge determiner 42 decides it as convergence.

The second multiplexer 482 outputs a first error value err_b(n) to drive it in a blind mode if the diverge/converge determiner 42 decides it as divergence. The second multiplexer 482 outputs a second error value err_dd(n) if the diverge/converge determiner 42 decides it as convergence.

The third multiplexer 483 outputs a first step size mu_b if the diverge/converge determiner 42 decides it as divergence. The third multiplexer 483 outputs a second step size mu_dd if the diverge/converge determiner 42 decides it as convergence.

The multiplier 484 multiplies the second step size outputted from the third multiplexer 483 and the output from the second multiplexer 482. The multiplying result is inputted to the FFF 410 and the FBF 420 as coefficient.

When a multiplexing signal DFE_b is 0, the multiplexer 424 has a value 0 and the multiplexer 481 inputs a value of xb(n) that is 0 to the FBF 420. Also, the second multiplexer 482 makes an error value err(n) to be a first error value err_b(n) of a decision directed mode. The decision feedback equalizer DFE is operated as a blind mode, and a FFF is only driven and the output value of the FBF becomes 0. When the multiplexing signal DFE_b is 1, a blind equalizer is operated as a decision directed mode, and the first to third multiplexers 481 to 483 and the multiplexer 424 output the inputted value.

Table 3 shows bit error rates (BER) obtained from a first simulation of forcedly setting the output DEF_b of the diverge/converge determiner 42 as 1 while driving a DFE in a blind mode and a second simulation of driving the DFE according to the present invention.

TABLE 3

| | |
|---|---|
| Ratio of bit energy and noise | 14 dB |
| Modulation | 64 QAM |
| BER of a first simulation | 3.2895e−3 |
| BER of a second simulation | 2.2284e−3 |

As shown in Table 3, in the second simulation of using the decision feedback equalizing apparatus according to the present embodiment, the BER is about 2.3384e-3. In the first simulation, the BER is about 2.3895e-2. Therefore, it proves that the method of using the decision feedback equalizing apparatus according to the present embodiment provides less error rate.

As described above, the decision feedback equalizing apparatus according to the present invention can receive difference input in a blind mode and a decision directed mode. Therefore, it can be stably operated. Also, the recognition rate of the receiving signal can increase.

In the present invention, tab coefficients of the decision feedback equalizer are updated through a least mean square (LMS) algorithm. Also, the mean square error and the threshold value are compared to determine whether the equalizer is converged or not. Therefore, the decision feedback equalizer can be stably operated. Also, the performance of the decision feedback equalizer is improved by stopping the FBF temporarily when the decision feedback equalizer is operated in a blind mode and driving the FBF again when the decision feedback equalizer is operated in a decision directed mode.

The present application contains subject matter related to Korean patent application Nos. 2005-0121138 and 2006-0074179, filed with the Korean patent office on Dec. 9, 2005, and Aug. 7, 2006, respectively, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A decision feedback equalizing apparatus comprising:

an equalizing device including a feed forward filter (FFF) that corrects a distorted transmission channel by receiving a match-filtered signal and a feedback filter (FBF) that reduces an inter symbol interference (ISI) of the corrected transmission channel, the equalizing device configured to selectively use the FBF to drive only the FFF in a blind mode and to drive both the FFF and the FBF in a decision directed mode;

a diverge/converge determining device that determines whether the decision feedback equalizing apparatus is diverged or converged using a means square error (MSE) obtained through a least means square (LMS) algorithm; and a filter controlling device that controls the equalizing device in the blind mode if the decision feedback equalizing apparatus is determined as divergence, and that controls the equalizing device in the decision directed mode if the decision feedback equalizing apparatus is determined as convergence, wherein the equalizing device includes the feed forward filter that receives a match-filtered signal and filters the received signal to correct a distorted transmission channel using the input match-filtered signal and error values differently inputted according to the blind mode and the decision directed mode; and the feedback filter that receives an output signal of a slicer in the decision directed mode, and that filters the output signal to reduce the ISI of the corrected transmission channel.

2. A decision feedback equalizing apparatus comprising:

an equalizing device including a feed forward filter (FFF) that corrects a distorted transmission channel by receiving a match-filtered signal and a feedback filter (FBF) that reduces an inter symbol interference (ISI) of the corrected transmission channel, the equalizing device configured to selectively use the FBF to drive only the FFF in a blind mode and to drive both the FFF and the FBF in a decision directed mode;

a diverge/converge determining device that determines whether the decision feedback equalizing apparatus is diverged or converged using a means square error (MSE) obtained through a least means square (LMS) algorithm; and a filter controlling device that controls the equalizing device in the blind mode if the decision feedback equalizing apparatus is determined as divergence, and that controls the equalizing device in the decision directed mode if the decision feedback equalizing apparatus is determined as convergence, wherein the equalizing device includes:

the feed forward filter that receives a match-filtered signal and filters the received signal to correct a distorted transmission channel using the input match-filtered signal and error values differently inputted according to the blind mode and the decision directed mode;

the feedback filter that receives an output signal of a slicer in the decision directed mode, and that filters the output signal to reduce the ISI of the corrected transmission channel;

a subtracting device that subtracts a filtering signal of the FFF and a filtering signal of the FBF; and a down sampling device that down-samples the subtracted signal to a symbol speed and outputs an equalizing signal.

3. A decision feedback equalizing apparatus comprising:

an equalizing device including a feed forward filter (FFF) that corrects a distorted transmission channel by receiving a match-filtered signal and a feedback filter (FBF) that reduces an inter symbol interference (ISI) of the corrected transmission channel, the equalizing device configured to selectively use the FBF to drive only the FFF in a blind mode and to drive both the FFF and the FBF in a decision directed mode;

a diverge/converge determining device that determines whether the decision feedback equalizing apparatus is diverged or converged using a means square error (MSE) obtained through a least means square (LMS) algorithm; and a filter controlling device that controls the equalizing device in the blind mode if the decision feedback equalizing apparatus is determined as divergence, and that controls the equalizing device in the decision directed mode if the decision feedback equalizing apparatus is determined as convergence, wherein the diverge/converge determining device includes:

a slicing device that creates a slicer output signal by receiving an outputs signal from the down sampling means, and that calculates a second error value by subtracting the created slicer output signal from the output signal;

a mean square error calculating device that calculates a mean square error value using the LMS algorithm with the second error value;

a first threshold comparing device that controls to reduce a step size and initializes a tab coefficient by determining as divergence if the mean square error value is larger than the first threshold value;

a second threshold comparing device that sets a counter value to 0 by determining as divergence if the mean square value is smaller than the first threshold value and larger than a second threshold value;

a counter calculating device that increases the counter value by one if the mean square error value is smaller than the second threshold value; and a third threshold comparing devices that restores the counter value to 0 and determines as divergence if the increased counter value is smaller than a third threshold value, and determines as convergence if the increased counter value is larger than the third threshold value.

4. The decision feedback equalizing apparatus as recited in claim 3, wherein the filter controlling device includes:

a multi-coefficient generating device that generates a first error value using a multi-modulus algorithm by receiving the output signal;

a first multiplexing device that inputs 0 to the feedback filter to drive the equalizing device in the blind mode if the diverge/converge determining device determines as divergence, and that inputs the slicer output to the feedback filter to drive the equalizing device in the decision directed mode if the diverge/converge determining device determines as convergence;

a second multiplexing device that outputs the first error value to drive the equalizing device in the blind mode if the divergence is determined, and that outputs the second error value if the convergence is determined;

a third multiplexing device that outputs a first step size if the divergence is determined and outputs a second step size if the convergence is determined; and a multiplying device that multiplies the second step size from the third multiplexing device and the output value of the second multiplexing device.

5. A decision feedback equalizing apparatus selectively using a feedback filter, comprising:

an equalizing device including a feed forward filter (FFF) that corrects a distorted transmission channel by receiving a match-filtered signal and a feedback filter (FBF) that reduces an inter symbol interference (ISI) of the corrected transmission channel, the equalizing device configured to selectively use the FBF to drive only the FFF in a blind mode and to drive both the FFF and the FBF in a decision directed mode;

a diverge/converge determining device that determines whether the decision feedback equalizing apparatus is diverged or converged using a means square error (MSE) obtained through a least means square (LMS) algorithm; and a filter controlling device that controls the equalizing device in the blind mode if the decision feedback equalizing apparatus is determined as divergence, and that controls the equalizing device in the decision directed mode if the decision feedback equalizing apparatus is determined as convergence, wherein the diverge/converge determining device includes:

a slicing device that creates a slicer output signal by receiving an outputs signal from the down sampling means, and that calculates a second error value by subtracting the created slicer output signal from the output signal;
a mean square error calculating device that calculates a mean square error value using the LMS algorithm with the second error value;
a first threshold comparing device that controls to reduce a step size and initializing a tab coefficient by determining as divergence if the mean square error value is larger than the first threshold value;
a second threshold comparing device that sets a counter value to 0 by determining as divergence if the mean square value is smaller than the first threshold value and larger than a second threshold value;
a counter calculating device that increases the counter value by one if the mean square error value is smaller than the second threshold value; and
a third threshold comparing device that restores the counter value to 0 and determines as divergence if the increased counter value is smaller than a third threshold value, and determines as convergence if the increased counter value is larger than the third threshold value,
wherein the filter controlling device includes:
a multi-coefficient generating device that generates a first error value using a multi-modulus algorithm by receiving the output signal;
a first multiplexing device that inputs 0 to the feedback filter to drive the equalizing device in the blind mode if the diverge/converge determining device determines as divergence, and that inputs the slicer output to the feedback filter to drive the equalizing device in the decision directed mode if the diverge/converge determining device determines as convergence;
a second multiplexing device that outputs the first error value to drive the equalizing device in the blind mode if the divergence is determined, and that outputs the second error value if the convergence is determined;
a third multiplexing device that outputs a first step size if the divergence is determined and outputs a second step size if the convergence is determined; and
a multiplying device that multiplies the second step size from the third multiplexing device and the output value of the second multiplexing device, and
wherein the multi-coefficient generating device generates the first error value using equation:

$$err\_b(n)=real(y(n))\times(R\_MMA^2-|real(y(n))|^2)$$
$$(R\_MMA=0.9382)+j*imag(y(n))\times(R\_MMA^2-|imag(y(n))|^2)$$

wherein err_b(n) denotes a first error value, y(n) denotes an output signal, n denotes time, j denotes an imaginary number, real( ) denotes a real number part, and imag( ) denotes a complex number part.

6. The decision feedback equalizing apparatus as recited in claim 5, wherein the mean square error calculating device calculates the mean square error value using following equations:

$$err\_dd(n) = d(n) - y(n), \text{ and}$$

$$mse\_dd(n) = \frac{\sum_{n=0}^{63}(|err\_dd(n)|^2)}{64}$$

, wherein err_dd(n) denotes a second error value, d(n) denotes a slicer output, y(n) denotes an output signal, and mse_dd(n) denotes a mean square error value.

7. An equalizing method applied to a decision feedback equalizing apparatus including a feed forward filter and a feedback filter, comprising:
a) performing an equalization using only the feed forward filter at an initial stage;
b) determining whether the decision feedback equalizing apparatus is diverged or converged using a means square error (MSE) obtained through a least means square (LMS) algorithm for the equalization result from the step a);
c) performing a blind equalization that drives the feed forward filter only if the divergence is determined at the step b) and performing the step b) to determine whether the decision feedback equalizing apparatus is diverged or converged for the blind equalization result; and
d) performing a decision directed equalization that drives both the feed forward filter and the feedback filter if the convergence is determined at the step b), and performing the step b) to determine whether the decision feedback equalizing apparatus is diverged or converged,
wherein the step b) includes calculating a first error value using a multi-modulus algorithm with an output signal of the feed forward filter, creating a slicer output signal by slicing an output signal of the feed forward filter, calculating a second error value using the created slicer output signal, and calculating a mean square error value using the LMS algorithm with the second error value.

8. An equalizing method applied to a decision feedback equalizing apparatus including a feed forward filter and a feedback filter, comprising:
a) performing an equalization using only the feed forward filter at an initial stage;
b) determining whether the decision feedback equalizing apparatus is diverged or converged using a means square error (MSE) obtained through a least means square (LMS) algorithm for the equalization result from the step a);
c) performing a blind equalization that drives the feed forward filter only if the divergence is determined at the step b) and performing the step b) to determine whether the decision feedback equalizing apparatus is diverged or converged for the blind equalization result; and
d) performing a decision directed equalization that drives both the feed forward filter and the feedback filter if the convergence is determined at the step b), and performing the step b) to determine whether the decision feedback equalizing apparatus is diverged or converged,
wherein the step b) includes:
b-1) calculating a first error value using a multi-modulus algorithm with an output signal of the feed forward filter, creating a slicer output signal by slicing an output signal of the feed forward filter, calculating a second error value using the created slicer output signal, and calculating a mean square error value using the LMS algorithm with the second error value;
b-2) reducing a step size and initializing a tab coefficient by determining as divergence if the mean square error value is larger than the first threshold value;
b-3) setting a counter value to 0 by determining as divergence if the mean square value is smaller than the first threshold value and larger than a second threshold value;
b-4) increasing a counter value by one if the mean square error value is smaller than the second threshold value; and
b-5) determining as divergence by restoring the counter value to 0 if the increased counter value is smaller than a third threshold value, and determining as convergence if the increased counter value is larger than the third threshold value.

9. An equalizing method applied to a decision feedback equalizing apparatus including a feed forward filter and a feedback filter, comprising:
  a) performing an equalization using only the feed forward filter at an initial stage;
  b) determining whether the decision feedback equalizing apparatus is diverged or converged using a means square error (MSE) obtained through a least means square (LMS) algorithm for the equalization result from the step a);
  c) performing a blind equalization that drives the feed forward filter only if the divergence is determined at the step b) and performing the step b) to determine whether the decision feedback equalizing apparatus is diverged or converged for the blind equalization result; and
  d) performing a decision directed equalization that drives both the feed forward filter and the feedback filter if the convergence is determined at the step b), and performing the step b) to determine whether the decision feedback equalizing apparatus is diverged or converged, wherein the steps c) and d) include:
controlling to input 0 to the feedback filter to drive the decision feedback equalizing apparatus in a blind mode if a divergence is determined in the step b) and to input the slicer output to the feedback filter to drive the decision feedback equalizing apparatus in a decision directed mode if a convergence is determined; and
controlling the decision feedback equalizing apparatus in a blind mode using a first error value and a first step size according to a multi-modulus algorithm if the divergence is determined, and controlling the decision feedback equalizing apparatus in a decision directed mode using the second error value and the second step size if the convergence is determined.

* * * * *